US008271312B2

(12) United States Patent
Huberman et al.

(10) Patent No.: US 8,271,312 B2
(45) Date of Patent: Sep. 18, 2012

(54) INTRODUCING REVENUE-GENERATING FEATURES

(75) Inventors: Bernardo Huberman, Palo Alto, CA (US); Christina Aperjis, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 281 days.

(21) Appl. No.: 12/868,645

(22) Filed: Aug. 25, 2010

(65) Prior Publication Data

US 2012/0053993 A1 Mar. 1, 2012

(51) Int. Cl.
*G06F 17/30* (2006.01)

(52) U.S. Cl. ...................................................... 705/7.11

(58) Field of Classification Search .................. 705/7.11
See application file for complete search history.

(56) References Cited

U.S. PATENT DOCUMENTS 7,848,943 B2 * 12/2010 Koide et al. .................. 705/7.25
2005/0216572 A1 9/2005 Tso et al.
2006/0212350 A1 9/2006 Ellis et al.
2008/0097838 A1 4/2008 Lin et al.
2009/0132373 A1 5/2009 Redlich
2010/0036733 A1 2/2010 Chan et al.
2010/0063881 A1 3/2010 Ghosh et al.

FOREIGN PATENT DOCUMENTS

WO 00/19332 4/2000
WO 2006/076424 7/2006

* cited by examiner

*Primary Examiner* — Romain Jeanty

(74) *Attorney, Agent, or Firm* — Scott A. Pojunas

(57) ABSTRACT

Example implementations relate to revenue generation based on introduction of revenue-generating features or inconvenience. In some implementations, the logarithmic convexity of a probability function is determined. The probability function may describe a probability that a user will continue to utilize the service based on a level of inconvenience or number of revenue-generating features introduced to the service. In some implementations, a number of periods for introducing the inconvenience or revenue-generating features may then be determined based on the log convexity of the probability function.

20 Claims, 5 Drawing Sheets

INTRODUCING REVENUE-GENERATING FEATURES

BACKGROUND

With the rapid growth of the Internet in the last decade, consumers now have access to an abundance of services at little or no cost. For example, consumers may now access free email, news, weather, online encyclopedias, and countless other services on the web. This wealth of information at minimal cost has placed pressure on other service providers, such as publishers and radio stations, to lower or even eliminate subscription fees, advertisements, and other revenue-generating features.

Despite the expectation of many consumers for free services, a service provider incurs expenses in providing a service and generally desires to recoup these expenses. Furthermore, without the potential for profit, a service provider may lack the incentive to continue offering a service to consumers.

BRIEF DESCRIPTION OF THE DRAWINGS

The following detailed description references the drawings, wherein.

DETAILED DESCRIPTION

As detailed above, consumers, such as web-users, radio listeners, and newspaper readers, have come to expect services at little to no cost. At the same time, the ability to recoup costs or profit from a venture is important in incentivizing a service provider to continue offering a service.

In view of this conflict, a service provider with an established audience generally faces a dilemma in attempting to increase revenue by introducing revenue-generating features. Since the introduction of advertisements, subscription fees, and other revenue-generating features will generally be construed by consumers as an inconvenience, the service provider must exercise caution in introducing inconvenience or will otherwise experience an increase in users who stop utilizing the service.

Example implementations disclosed herein provide a solution to this dilemma by determining a rate at which revenue-generating inconvenience should be introduced to the service in a manner that maximizes revenue earned by the provider, while also maintaining a user base. For example, in some implementations, a probability function is identified that describes the probability that a given user will continue to utilize the service based on a corresponding level of inconvenience introduced to the service. Based on a determination of the log convexity of the probability function, example implementations may then determine an optimal number of periods over which the level of inconvenience should be introduced to generate provider revenue. For example, when the probability function is logarithmically convex, example implementations may determine that the level of inconvenience should be introduced in a single increase. Otherwise, when the probability function is not logarithmically convex, example implementations may determine the number of periods for introducing the inconvenience by solving an optimization problem.

In this manner, implementations disclosed herein enable a service provider to determine an ideal level of inconvenience that increases revenue and a number of periods for introducing that inconvenience, while also minimizing the loss of users due to the inconvenience. Additional implementations and applications of such implementations will be apparent to those of skill in the art upon reading and understanding the following description.

Figure 1:
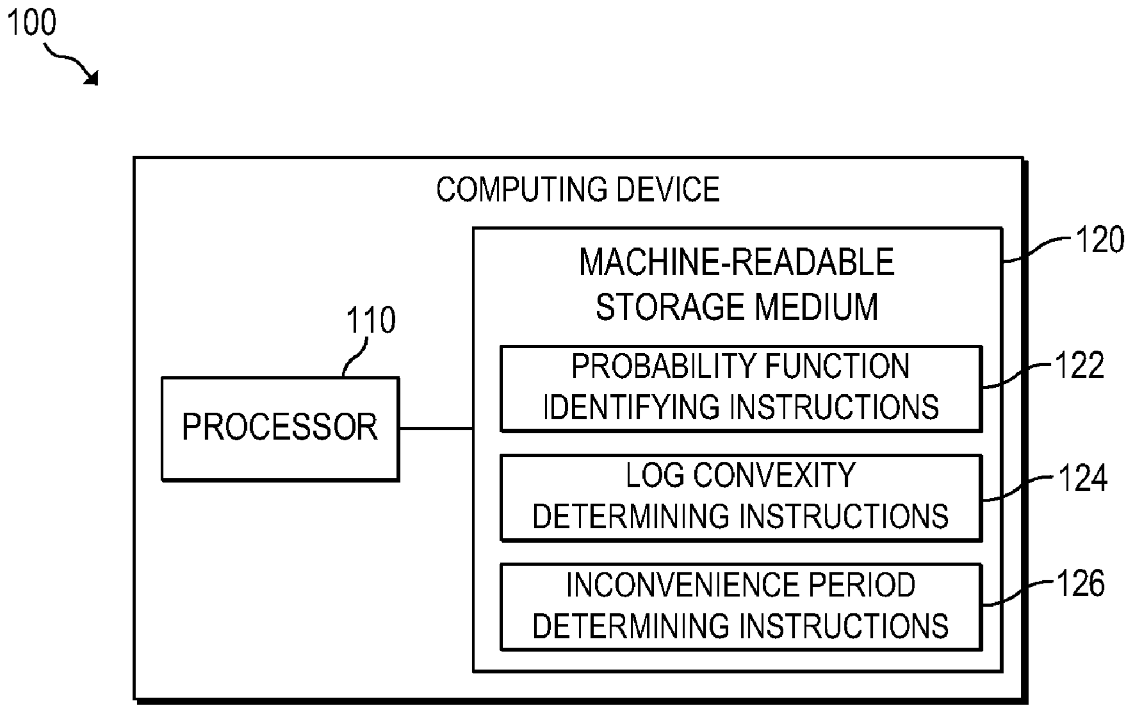
FIG. 1 is a block diagram of an example computing device for determining a number of periods for introducing revenue-generating inconvenience to a service.

Referring now to the drawings, FIG. 1 is a block diagram of an example computing device 100 for determining a number of periods for introducing revenue-generating inconvenience to a service by a service provider. A service provider may be, for example, an individual, a corporation, or any other entity that offers a service to a group of users. To name a few example services, a service provider may operate a website, publish books, newspapers, magazines, podcasts, or music, offer Internet or cable service, or provide wireless phone service. It should therefore be understood that a service provider may be any entity that provides a service to users, where a service is a tangible or intangible product or resource. A user may be any individual who uses, downloads, reads, listens to, or otherwise consumes a service offered by a service provider.

As described above, a service provider may desire to earn revenue based on provision of a service to an existing user base. More specifically, a service provider may desire to earn revenue by introducing a set of revenue-generating features to the service. Because existing users typically view these features as an inconvenience, these features may be referred to herein as revenue-generating inconvenience. As described below, computing device 100 may include components for determining a number of periods over which revenue-generating inconvenience should be introduced to the service in a manner that maximizes revenue earned by the service provider.

Computing device 100 may be, for example, a workstation, a server, a notebook computer, a desktop computer, an all-in-one system, a slate computing device, or any other computing device suitable for execution of the functionality described below. In the implementation of FIG. 1, computing device 100 includes processor 110 and machine-readable storage medium 120.

Processor 110 may be one or more central processing units (CPUs), semiconductor-based microprocessors, and/or other hardware devices suitable for retrieval and execution of instructions stored in machine-readable storage medium 120. Processor 110 may fetch, decode, and execute instructions 122, 124, 126 to implement the inconvenience rate determining procedure described in detail below. As an alternative or in addition to retrieving and executing instructions, processor 110 may include one or more integrated circuits (ICs) or other electronic circuits that include a number of electronic components for performing the functionality of one or more of instructions 122, 124, 126.

Machine-readable storage medium 120 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As described in detail below, machine-readable storage medium 120 may be encoded with executable instructions for determining a number of periods over which a level of revenue-generating inconvenience should be introduced to a service by a service provider.

Machine-readable storage medium 120 may include probability function identifying instructions 122, which may identify a probability function describing a probability that a user will continue to utilize a service as a function of a level of inconvenience introduced to the service by the service provider. For example, the probability function may be defined by a function, p(x), where x is the level of inconvenience introduced to the service and p(x) is the probability that a user will continue to utilize the service after the inconvenience is increased by x. The inconvenience may include, for example, advertisements, subscription fees, marketing communications, or any other feature from which the service provider may earn revenue.

In some implementations, identifying instructions 122 may identify the probability function as a plurality of data points, where each data point represents the probability that the user will continue to utilize the service when a corresponding level of inconvenience is introduced. For example, the following table illustrates a number of levels of a subscription fee, x, and a corresponding probability, p(x), for each subscription fee:

TABLE 1

Example Probability Data

| Inconvenience (x) | 2 | 5 | 10 | 15 | 20 | 30 |
|---|---|---|---|---|---|---|
| p(x) | 0.9 | 0.8 | 0.6 | 0.38 | 0.2 | 0.05 |

Thus, as detailed in the table above, when a subscription fee of $2 is introduced to the service, a given user has a probability of 0.9 of continuing to utilize the service. Stated differently, when a subscription fee of $2 is introduced, it is predicted that nine out of ten users will pay the fee and continue to utilize the service. The table contains a number of additional probability function values for a number of subscription fee levels.

In implementations in which the probability function is a number of data points, identifying instructions 122 may receive entry of each of the data points from a user of computing device 100. Alternatively, identifying instructions 122 may derive each of the data points based on a testing or survey procedure. For example, in some implementations, instructions 122 may utilize an A/B testing methodology to compare a control sample of users to which no inconvenience is introduced to a test sample of users to which varying levels of inconvenience are introduced. An example test procedure utilizing this technique is described below in connection with FIG. 5. As an alternative, identifying instructions 122 may derive the data points using a survey by which a test sample of users are queried to determine whether the users would continue to utilize the service when varying levels of inconvenience are introduced. As a specific example, identifying instructions 122 could send a survey to 100 users, asking each user whether he or she would continue to utilize the service if charged $2, $5, $10, $15, $20, and $30. Instructions 122 could then determine p(x) for each subscription value based on the total number of users who answered yes for each fee divided by the total number of users who answered the survey.

In some implementations, identifying instructions 122 may instead identify the probability function as a mathematical function that describes or estimates the probability for all values of x. For example, identifying instructions 122 may receive entry of the function from a user of computing device 100. Alternatively, identifying instructions 122 may determine a line, polynomial, or other function of best fit for a plurality of data points entered by the user or obtained using a testing or survey procedure.

Machine-readable storage medium 120 may also include log convexity determining instructions 124, which may determine whether the identified probability function is logarithmically convex. In general, a function, f(x), is said to be logarithmically convex if log(f(x)) is convex. The function log(f(x)) is convex over an interval [a, b] if the following inequality is satisfied for any two points $x_1$ and $x_2$ in [a, b] and any λ, where 0<λ<1:

$$\log(f[\lambda x_1+(1-\lambda)x_2] \leqq \lambda\log(f(x_1))+(1-\lambda)\log(f(x_2)) \qquad \text{[Inequality 1]}$$

Determining instructions 124 may therefore be configured to determine whether p(x) is logarithmically convex based on examination of the function, log(p(x)). Thus, when p(x) is expressed as a mathematical function, determining instructions 124 may simply determine whether Inequality 1 is satisfied when f(x) is p(x).

Alternatively, when the probability function is defined as a plurality of data points, determining instructions 124 may determine whether p(x) is logarithmically convex based on examination of the values of the data points. For example, determining instructions 124 may include instructions for calculating a value, θ, for each set of consecutive data points, $x_{i-1}$, $x_i$, and $x_{i+1}$, where:

$$\theta = \frac{x_{i+1} - x_i}{x_{i+1} - x_{i-1}} \qquad \text{[Equation 1]}$$

After calculating θ for each set of consecutive data points, determining instructions 124 may execute instructions for determining, for each set of consecutive data points, whether the following inequality is satisfied:

$$\log(p(x_i)) \leqq \theta\log(p(x_{i-1}))+(1-\theta)\log(p(x_{i+1})) \qquad \text{[Inequality 2]}$$

If the inequality is satisfied for all sets of consecutive data points, determining instructions 124 may determine that the probability function is logarithmically convex. Otherwise, if the inequality is not satisfied for any set of consecutive data points, instructions 124 may determine that the probability function is not logarithmically convex.

Finally, machine-readable storage medium 120 may include inconvenience period determining instructions 126, which may determine the number of periods over which the level of inconvenience should be introduced to the service to maximize revenue of the service provider. Determining instructions 126 may determine the number of periods based on whether the probability function is logarithmically convex.

For example, when log convexity determining instructions 124 determine that the probability function is logarithmically convex, determining instructions 126 may determine that the inconvenience may be introduced in one period, such that the level of inconvenience is introduced in a single increase. Determining instructions 126 may also trigger instructions for calculating the appropriate level of inconvenience as a value that maximizes a total revenue function. The total revenue function may be defined as the probability function multiplied by a revenue earned by the service provider per user for a particular level of inconvenience. That is, the total revenue function may be defined as p(x)*r(x), where r(x) is the revenue earned by the provider per period per user by introducing the level of inconvenience, x. Determining instructions 126 may determine this value by, for example, determining p(x)*r(x) for each of a plurality of values of x and determining which value of x yields the largest value of p(x)*r(x). After determining the level of inconvenience, determining instructions 126 may notify the user of computing device 100 of the particular level of inconvenience, x, and instruct the user that the inconvenience should be introduced to the service all at once.

Alternatively, when log convexity determining instructions 124 determine that the probability function is not logarithmically convex, inconvenience period determining instructions 126 may determine that, to maximize revenue, the level of inconvenience should be introduced gradually over a number of periods. Accordingly, determining instructions 126 may trigger instructions for solving an optimization problem to find the number of periods and the level of inconvenience that maximize a revenue function representing a total revenue earned over future periods. In such instances, the revenue for each future period may be equal to a value representing a fraction of remaining users predicted using the probability function, p(x), multiplied by a potential revenue for the future period as determined using a revenue function, r(x).

Determining instructions 126 may utilize any technique for solving a two-dimensional optimization problem, where the two variables are the number of periods, z, and the level of inconvenience, x, to be introduced in each of the plurality of periods. In some implementations, determining instructions 126 may also account for a discount factor, δ, which represents how the service provider values future payments (e.g., a value of 0.98 may indicate that the provider values future payments 2% less than a present payment). Thus, determining instructions 126 may, for example, utilize an optimization problem solver to determine the optimal solution to the following problem:

$$\text{Maximize: } \prod(x, z) \equiv \sum_{i=1}^{z-1} \delta^{(i-1)} p(x)^i r(ix) + \frac{\delta^{z-1}}{1-\delta} p(x)^z r(xz) \quad \text{[Problem 1]}$$

$$\text{Subject to: } x \geq 0$$

$$z \in N^*$$

In some implementations, determining instructions 126 may simplify the determination when the revenue function, r(x), is logarithmically concave. In particular, in such implementations, the problem may be simplified to the one-dimensional problem of maximizing Π(x, z*(x)), where:

$$z^*(x) = \min\left\{z \in N: \frac{r(x \cdot z)}{r(x \cdot (z+1))} \geq p(x)\right\} \quad \text{[Equation 2]}$$

After determining the level of inconvenience, determining instructions 126 may notify the user of computing device 100 that the inconvenience should be introduced gradually to maximize revenue. Determining instructions 126 may also notify the user of the determined number of periods and the level of inconvenience to be introduced during each of the periods.

Figure 2:
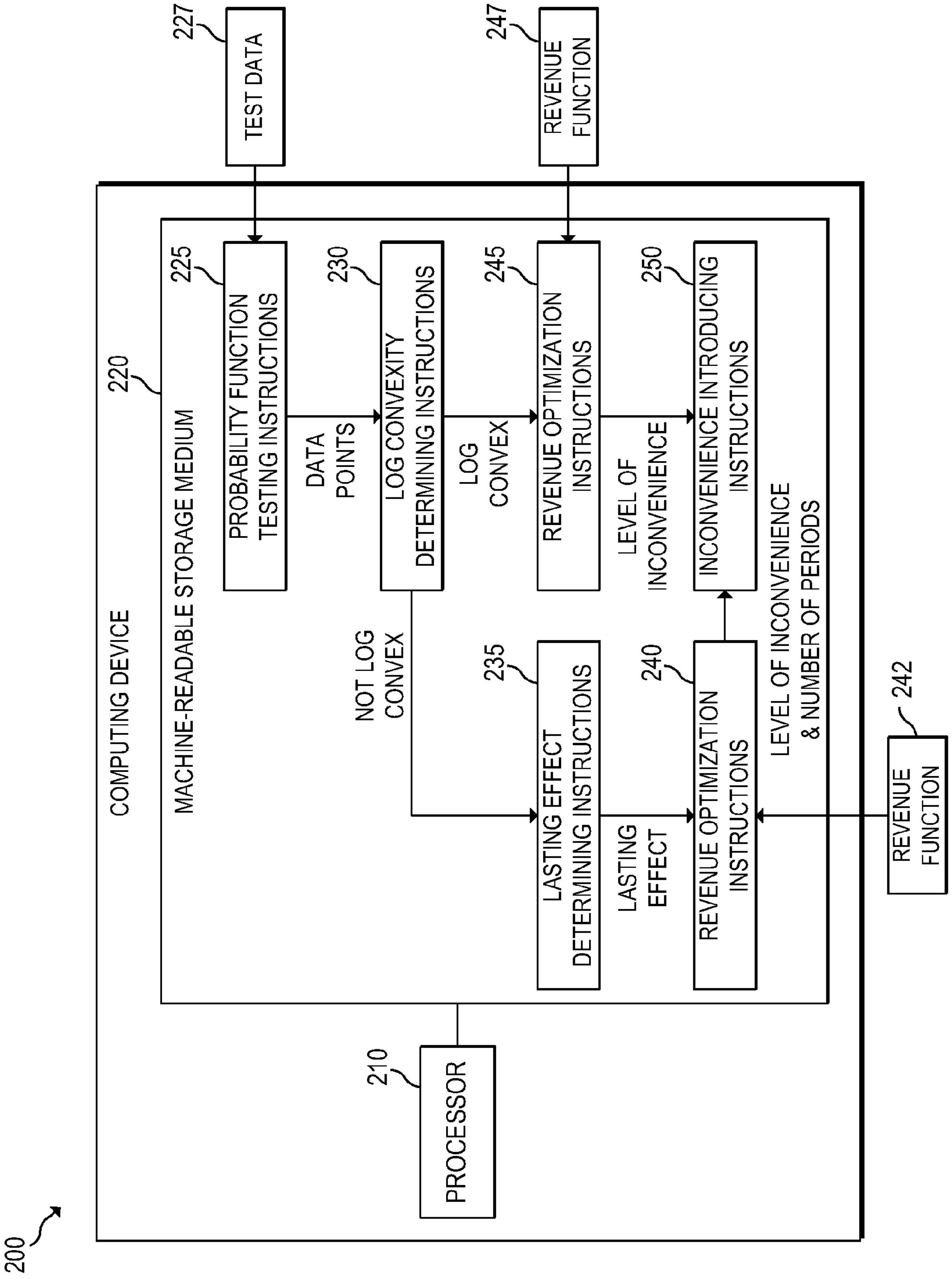
FIG. 2 is a block diagram of an example computing device for determining a number of periods for introducing revenue-generating inconvenience to a service based on a test procedure and a lasting effect of inconvenience.

FIG. 2 is a block diagram of an example computing device 200 for determining a number of periods for introducing revenue-generating inconvenience to a service based on a test procedure and a lasting effect of inconvenience. As with computing device 100 of FIG. 1, computing device 200 may be, for example, a workstation, a server, a notebook computer, a desktop computer, an all-in-one system, a slate computing device, or any other computing device suitable for execution of the functionality described below. In the implementation of FIG. 2, computing device 200 includes processor 210 and machine-readable storage medium 220.

As with processor 110, processor 210 may be a CPU or microprocessor suitable for retrieval and execution of instructions and/or one or more electronic circuits configured to perform the functionality of one or more of instructions 225, 230, 235, 240, 245, 250 described below. Machine-readable storage medium 220 may be any electronic, magnetic, optical, or other physical storage device that contains or stores executable instructions. As described in detail below, machine-readable storage medium 220 may be encoded with executable instructions for determining a level of revenue-generating inconvenience to be introduced to a service offered by a service provider.

Machine-readable storage medium 220 may include probability function testing instructions 225, which may identify a probability function describing a probability that a user will continue to utilize the service as a function of a level of inconvenience introduced to the service. In some implementations, probability function testing instructions 225 may identify the probability function as a plurality of data points, each representing a probability that a given user will continue utilizing the service when a corresponding level of inconvenience is introduced to the service.

In the implementation of FIG. 2, testing instructions 225 may identify each of the data points based on a testing procedure and resulting test data 227. As one example, testing instructions 225 may utilize an A/B testing methodology in which a control sample is compared to a number of single-variable test samples to predict a probability that users will continue to utilize the service when varying levels of inconvenience are introduced. For example, testing instructions 225 may select a subset of users as a control sample and, for these users, maintain the current level of inconvenience over time. Testing instructions 225 may also select a number of test groups and, for each test group, introduce a predetermined level of inconvenience at a given time. As a result of the test, testing instructions 225 may receive test data 227 representing the fraction of users in the control group and each test group that continued to utilize the service.

Testing instructions 225 may then identify the probability function data points using test data 227. For example, testing instructions 225 may determine the fraction of test group users who continued to utilize the service at each of the plurality of levels of inconvenience, thereby obtaining a data point for the function p(x) at each of a number of levels of inconvenience, x. In some implementations, testing instructions 225 may offset each identified data point for a particular level of inconvenience according to the fraction of users in the control sample who stopped utilizing the service. In this manner, testing instructions 225 may ensure that the determined probability function data points account for user loss due to introduction of inconvenience, rather than user loss for other reasons. As a specific example, suppose that 95% of users in a control sample continued to utilize the service, while 75% of users in a test sample for a $10 subscription fee continued to utilize the service. In this scenario, 5% of the users stopped using the service even though no inconvenience was introduced. Accordingly, testing instructions 225 may determine p(10) as (75%+(100%−95%))/100, which equals 0.8.

Log convexity determining instructions 230 may operate similarly to log convexity determining instructions 124 of FIG. 1. Thus, log convexity determining instructions 230 may determine whether the probability function identified by testing instructions 225 is logarithmically convex. In implementations in which the probability function is a plurality of data points, determining instructions 230 may determine whether Inequality 2, identified above in connection with FIG. 1, is satisfied for all sets of consecutive data points. If so, determining instructions 230 may determine that the probability function is logarithmically convex. Otherwise, if the inequality is not satisfied for any set of consecutive data points, instructions 230 may determine that the probability function is not logarithmically convex.

When log convexity determining instructions 230 determine that the probability function is not logarithmically convex, lasting effect determining instructions 235 may be executed. In some contexts, the likelihood of a user continuing to utilize the service may be further decreased when the same level of inconvenience is introduced multiple times. For example, a user may be displeased when the service provider increases a subscription fee increase multiple times and, as a result, may be more likely to stop using the service after a second introduction of inconvenience. Thus, lasting effect determining instructions 235 may be executed in some implementations to determine the cumulative effect of multiple introductions of inconvenience on the probability that a given user will continue to utilize the service.

Lasting effect determining instructions 235 may, for example, determine a value, ϵ, by which the probability function is decreased upon a repeated introduction of a level of inconvenience, x. As described in detail below, this value may then be used in the optimization calculation to adjust the value of the probability function in periods subsequent to the first introduction of inconvenience.

In some implementations, a user of computing device 200 may enter a value of the lasting effect, ϵ, using a user interface of device 200. Alternatively, in other implementations, lasting effect determining instructions 235 may estimate the lasting effect based on test data 227 obtained by probability function testing instructions 225. For example, for a given level of inconvenience, x, determining instructions 235 may identify a fraction of users, p(x), that continued to utilize the service after a first introduction of the level of inconvenience. Determining instructions 235 may then identify a fraction of the remaining users, $p_2(x)$, that continued to utilize the service after a second introduction of the level of inconvenience, x. Determining instructions 235 may then estimate the lasting effect value, ϵ, as $p(x)-p_2(x)$. As detailed below, E may be used to account for the cumulative effect of introductions of inconvenience when determining an optimal number of periods and level of inconvenience.

Revenue optimization instructions 240 may determine, when the probability function is not logarithmically convex, a number of periods for introducing the level of inconvenience that maximizes the total revenue over time. As detailed above in connection with instructions 126 of FIG. 1, when the probability function is not logarithmically convex, the total revenue earned by the service provider may be maximized by gradually introducing the inconvenience over a number of periods. Revenue optimization instructions 240 may therefore determine the number of periods and the level of inconvenience by solving an optimization problem to maximize the total revenue earned over future periods. The total revenue may be the sum of the revenue calculated for each future period, while the revenue for each future period may be a value of a revenue function 242 for a current level of inconvenience during the period multiplied by a fraction of users remaining during the period, as predicted using the probability function.

In some implementations, revenue optimization instructions 240 may determine the optimal level of inconvenience and number of periods by solving Problem 1, detailed above in connection with determining instructions 126 of FIG. 1. As an alternative, in implementations in which the lasting effect, ϵ, of multiple introductions of inconvenience is to be considered, optimization instructions 240 may, for example, utilize an optimization problem solver to determine the optimal solution to the following problem [Problem 2]:

$$\text{Maximize: } \prod(x, z) \equiv \sum_{i=1}^{z-1} \delta^{(i-1)} \cdot \left( \prod_{j=1}^{i} p(x) - \varepsilon(j-1) \cdot x \right) \cdot r(ix) + \frac{\delta^{z-1}}{1-\delta} \left( \prod_{j=1}^{z} p(x) - \varepsilon(j-1) \cdot x \right) \cdot r(xz)$$

$$\text{Subject to: } x \geq 0$$

$$z \in N^*$$

In some implementations, revenue optimization instructions 240 may simplify the determination when the revenue function, r(x), is logarithmically concave. In such implementations, the problem may be simplified to the one-dimensional problem of maximizing Π(x, z*(x; ϵ)), where:

$$z^*(x; \varepsilon) = \min\left\{ z \in N: \frac{r(x \cdot z)}{r(x \cdot (z+1))} + \varepsilon \cdot d(z \cdot x) \geq p(x) \right\} \quad \text{[Equation 3]}$$

After determining the optimal level of inconvenience and number of periods, revenue optimization instructions 240 may provide the determined level of inconvenience and number of periods to inconvenience introducing instructions 250. As detailed below, inconvenience introducing instructions 250 may then introduce the determined level of inconvenience, x, over each of the following z periods.

Alternatively, when log convexity determining instructions 230 determine that the probability function is logarithmically convex, revenue optimization instructions 245 may be executed. Revenue optimization instructions 245 may determine that the level of inconvenience should be introduced in a single increase to maximize total revenue earned by the service provider. Optimization instructions 245 may then determine the level of inconvenience as a value that maximizes the probability function for a particular level of inconvenience multiplied by a revenue value for the particular level of inconvenience determined using a revenue function 247. Additional details for determining the optimal level of inconvenience are provided above in connection with inconvenience period determining instructions 126 of FIG. 1. After determining the optimal level of inconvenience and number of periods, revenue optimization instructions 245 may provide the determined level of inconvenience to inconvenience introducing instructions 250.

Inconvenience introducing instructions 250 may add the determined level of inconvenience to the service over the number of periods determined by revenue optimization instructions 240, 245. For example, when the service is a website, inconvenience introducing instructions 250 may add the determined number of advertisements and/or the determined subscription fee over the determined number of periods. As a more specific example, inconvenience introducing instructions 250 may be linked to a set of advertisement displaying instructions, such that the advertisement display instructions obtain the determined number of advertisements from introducing instructions 250 prior to outputting advertisements. Similarly, inconvenience introducing instructions 250 may be linked to a set of subscription fee receiving instructions, such that the fee receiving instructions restrict access to the website to only users who have paid the appropriate fee. Inconvenience introducing instructions 250 may be similarly implemented for a number of other services to provide for automatic incorporation of the inconvenience. For example, instructions 250 may be adapted for a podcast or music download process, a newspaper or magazine subscription process, or any other service for which advertisements, fees, or other revenue-generating inconveniences are to be introduced.

It should be noted that, in some implementations, the service provider may implement the increase in inconvenience. Accordingly, in such implementations, inconvenience introducing instructions 250 may simply output the determined level of inconvenience and number of periods, such that the service provider may manually implement the increase in inconvenience to the service.

Figure 3:
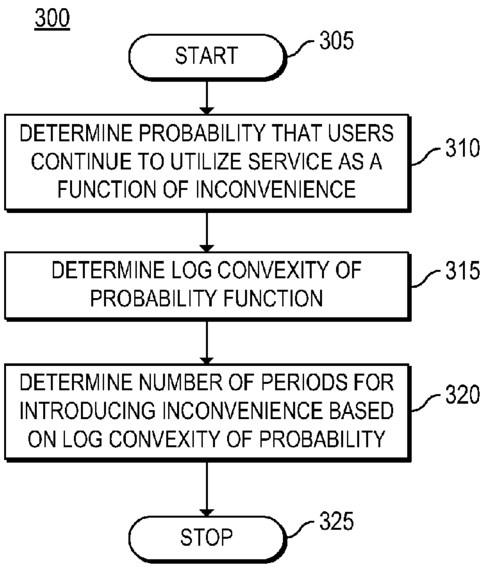
FIG. 3 is a flowchart of an example method for determining a number of periods for introducing revenue-generating inconvenience to a service.

FIG. 3 is a flowchart of an example method 300 for determining a number of periods for introducing revenue-generating inconvenience to a service. Although execution of method 300 is described below with reference to computing device 100, other suitable components for execution of method 300 will be apparent to those of skill in the art (e.g., computing device 200). Method 300 may be implemented in the form of executable instructions stored on a machine-readable storage medium, such as storage medium 120, and/or in the form of electronic circuitry.

Method 300 may start in block 305 and proceed to block 310, where computing device 100 may identify a probability function representing a probability that a user will continue using the service as a function of various increases in revenue-generating inconvenience. The probability function may be defined as a function, p(x), where x is the level of inconvenience and p(x) is the probability that a user will continue to utilize the service after the inconvenience is increased by x. Computing device 100 may identify the probability function as a plurality of data points or, alternatively, as a mathematical function. Additional details of an example procedure for identifying the probability function are provided above in connection with probability function identifying instructions 122 of FIG. 1.

After computing device 100 identifies the probability function, method 300 may proceed to block 315, where computing device 100 may determine whether the probability function is logarithmically convex. When the probability function is a mathematical function, computing device 100 may determine the logarithmic convexity by determining whether Inequality 1, detailed above, is satisfied for all values of x. Alternatively, when the probability function is a series of data points, computing device 100 may determine the logarithmic convexity by determining whether Inequality 2, also detailed above, is satisfied for each set of consecutive data points. When Inequality 1 or Inequality 2 is satisfied, computing device 100 may determine that the probability function is logarithmically convex.

After computing device 100 determines whether the probability function is logarithmically convex, method 300 may proceed to block 320, where computing device 100 may determine the number of periods for introducing the inconvenience based on the logarithmic convexity of the probability function. When the probability function is logarithmically convex, computing device 100 may determine that, to maximize provider revenue, the inconvenience should be introduced in a single increase. Computing device 100 may then determine the appropriate level of inconvenience as a value that maximizes a total revenue function defined as p(x)*r(x), where p(x) is the probability function and r(x) is the revenue earned by the provider for a given user in a given period for a particular level of inconvenience.

Alternatively, when the probability function is not logarithmically convex, computing device 100 may determine that, to maximize provider revenue, the inconvenience should be introduced gradually over a number of periods. Accordingly, computing device 100 may execute instructions for solving an optimization problem to find the number of periods and the level of inconvenience that maximize a revenue function representing a total revenue earned over future periods. For example, computing device 100 may solve Problem 1, detailed above, to find an optimal number of periods, z, and a level of inconvenience, x, to be introduced during each period. Additional details of an example procedure for determining the number of periods and level of inconvenience are provided above in connection with inconvenience period determining instructions 126 of FIG. 1. After determining the number of periods in block 320, method 300 may proceed to block 325, where method 300 may stop.

Figure 4:
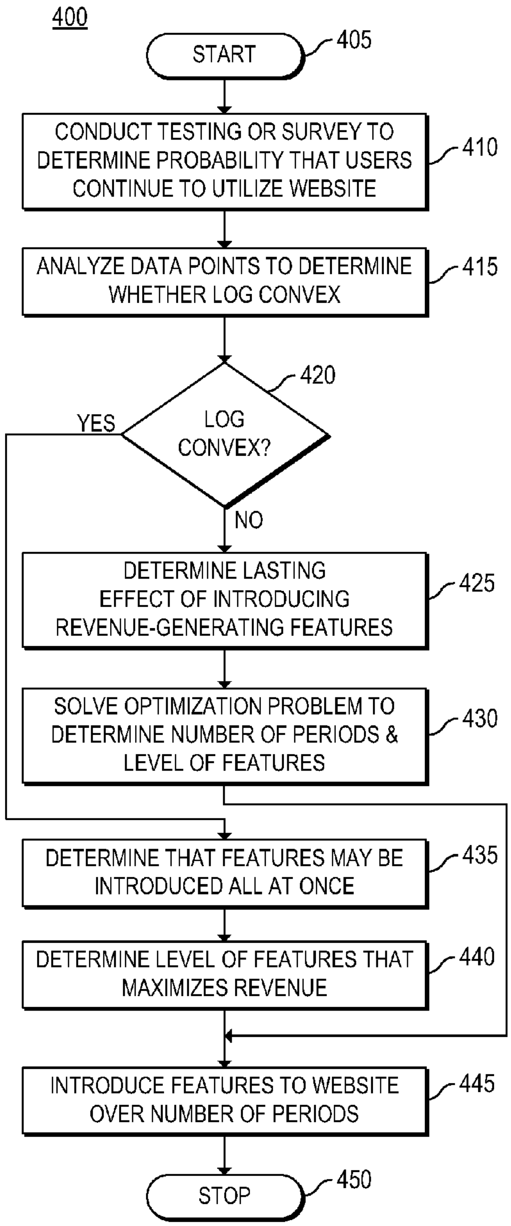
FIG. 4 is a flowchart of an example method for adding revenue-generating features to a website in a manner that generates revenue.

FIG. 4 is a flowchart of an example method 400 for adding revenue-generating features to a website in a manner that generates revenue. Although execution of method 400 is described below with reference to computing device 200, other suitable components for execution of method 400 will be apparent to those of skill in the art. Method 400 may be implemented in the form of executable instructions stored on a machine-readable storage medium, such as storage medium 220, and/or in the form of electronic circuitry. Furthermore, although described below in connection with a website, method 400 may be implemented in connection with any service.

Method 400 may start in block 405 and proceed to block 410, where computing device 200 may conduct a testing or survey procedure to determine the probability that users will continue to utilize the website as a function of various levels of revenue-generating features. The revenue-generating features may be, for example, advertisements, email or telephone marketing communications, subscription fees, and/or any other features that earn revenue for the service provider. To identify the probability values, computing device 200 may execute a testing procedure in which various numbers of revenue-generating features are added for one or more test groups, each including a subset of users of the website. Computing device 200 may then determine a plurality of values of the probability function, p(x), based on a fraction of users in the test group that continue to use the website after adding corresponding numbers of revenue-generating features, x.

Alternatively, computing device 200 may transmit a survey to each a plurality of users, requesting that each user indicate whether he or she would continue to utilize the website if a number of levels of revenue-generating features were introduced. Computing device 200 may then determine the value of the probability function, p(x), at each of a plurality of data points based on the results of the testing or survey procedure. Additional details of an example testing procedure are provided above in connection with probability function testing instructions 225 of FIG. 2 and below in connection with method 500 of FIG. 5.

After computing device 200 identifies a number of data points, method 400 may proceed to block 415, where computing device 200 may analyze the data points to determine whether the probability function is logarithmically convex. For example, computing device 200 may determine that the probability function is logarithmically convex when Inequality 2, detailed above, is satisfied for each set of consecutive data points. Additional details of an example procedure for determining the log convexity of a set of data points are provided below in connection with method 600 of FIG. 6.

After analyzing the data points, method 400 may proceed to block 420, where computing device 200 may determine whether the probability function is logarithmically convex based on the analysis. If the probability function is not logarithmically convex, method 400 may proceed to block 425, where computing device 200 may determine a value, $\epsilon$, representing the cumulative effect of multiple introductions of revenue-generating features on the probability that a given user will continue to utilize the website. For example, computing device 200 may identify a fraction of users, p(x), that continue to utilize the website after a first introduction of a level of revenue-generating features and a fraction of the remaining users, $p_2(x)$, that continue to utilize the website after a second introduction of revenue-generating features. Computing device 200 may then determine the lasting effect value, E, as $p(x)-p_2(x)$. Additional details of an example procedure for determining the lasting effect are provided above in connection with lasting effect determining instructions 235 of FIG. 2.

After computing device 200 determines the lasting effect value, method 400 may proceed to block 430, where computing device 200 may determine that the revenue-generating features should be introduced gradually over a number of periods. Computing device 200 may therefore solve an optimization problem to determine the number of periods and a number of revenue-generating features to be added during each period that maximize a total revenue earned by the revenue-generating features over future periods. For example, computing device 200 may solve Problem 2, detailed above, to determine a number of revenue-generating features, x, to be introduced over each of the following z periods. Additional details of an example procedure for determining the level of revenue-generating features are provided above in connection with revenue optimization instructions 240 of FIG. 2. After determining the optimal number of revenue-generating features and optimal number of periods, method 400 may proceed to block 445, described in detail below.

Alternatively, when it is determined in block 420 that the probability function is logarithmically convex, method 400 may proceed to block 435, where computing device 200 may determine that the revenue-generating features should be added to the website in a single increase equal to a total number of revenue-generating features. Method 400 may therefore proceed to block 440, where computing device 200 may calculate the total number of revenue-generating features as a value that maximizes the probability function for a particular number of revenue-generating features multiplied by the revenue earned for the particular number of revenue-generating features. In other words, computing device 200 may determine the number of revenue-generating features, x, that maximizes p(x)*r(x). Additional details of an example procedure for determining the optimal level of revenue-generating features are provided above in connection with revenue optimization instructions 245 of FIG. 2. After determining the optimal level of revenue-generating features, method 400 may proceed to block 445.

In block 445, computing device 200 may add the revenue-generating features to the website over the determined number of periods. For example, computing device 200 may provide the determined number of periods to a set of instructions for displaying advertisements on the website or charging a subscription fee. In this manner, the instructions for displaying the advertisements or charging the fee may appropriately introduce the determined number of revenue-generating over the determined number of periods. Additional details of an example procedure for introducing the revenue-generating features are provided above in connection with inconvenience introducing instructions 250 of FIG. 2. After adding the revenue-generating features to the website, method 400 may proceed to block 450, where method 400 may stop.

Figure 5:
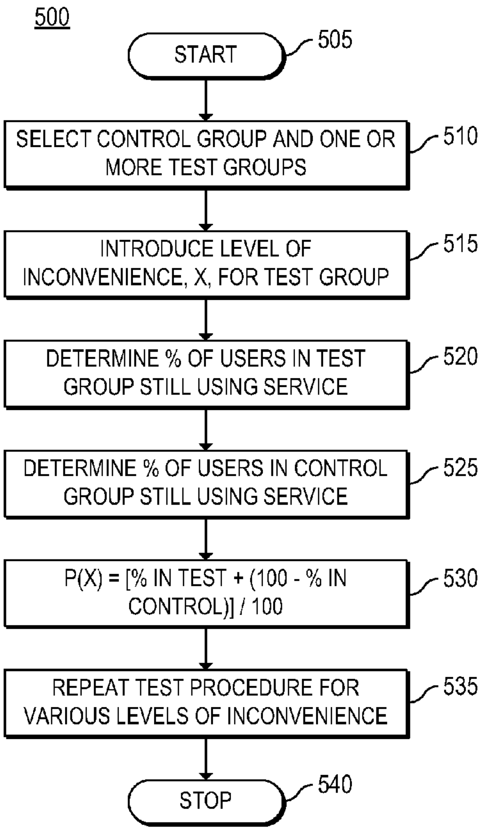
FIG. 5 is a flowchart of an example testing method for determining a probability that a user will continue to utilize a service as a function of a level of inconvenience introduced to the service.

FIG. 5 is a flowchart of an example testing method 500 for determining a probability that a user will continue to utilize a service as a function of a level of inconvenience introduced to the service. Although execution of method 500 is described below with reference to computing device 200, other suitable components for execution of method 500 will be apparent to those of skill in the art. Method 500 may be implemented in the form of executable instructions stored on a machine-readable storage medium, such as storage medium 220, and/or in the form of electronic circuitry.

Method 500 may start in block 505 and proceed to block 510, where computing device 200 may select a control group and one or more test groups. For example, computing device 200 may determine a size of each group and randomly select a number of users to assign to each group.

Method 500 may then proceed to block 515, where computing device 200 may introduce a given level of inconvenience, x, for a particular test group. For example, when the service is a website, computing device 200 may add a predetermined number of advertisements or introduce a predetermined subscription fee for the test group of users. Computing device 200 may similarly introduce advertisements, subscription fees, marketing emails, or other revenue-generating inconvenience in other types of services.

Method 500 may then proceed to block 520, where computing device 200 may determine the percentage of users in the test group that continued to utilize the service despite the introduction of the inconvenience in block 515. Next, method 500 may proceed to block 525, where computing device 200 may determine the percentage of users in the control group (i.e., users who did not experience the inconvenience) that are still utilizing the service.

After computing device 200 determines the percentage of users in the test and control groups, method 500 may proceed to block 530. In block 530, computing device 500 may adjust p(x) to account for users who stopped using the service for reasons other than the introduction of inconvenience. Computing device 200 may account for this amount by determining the percentage of users in the control group who stopped using the service and adding this number of the percentage of users remaining in the test group. Thus, computing device 200 may determine p(x) as [(% in test+(100−% in control)]/100.

After computing device 200 determines p(x), where x is the level of inconvenience introduced in block 515, method 500 may proceed to block 535. In block 535, computing device 200 may repeat the testing procedure for various levels of inconvenience and may thereby determine p(x) for each of a plurality of levels of inconvenience. After computing device 200 completes the testing procedure for each level of inconvenience, method 500 may proceed to block 540, where method 500 may stop.

Figure 6:
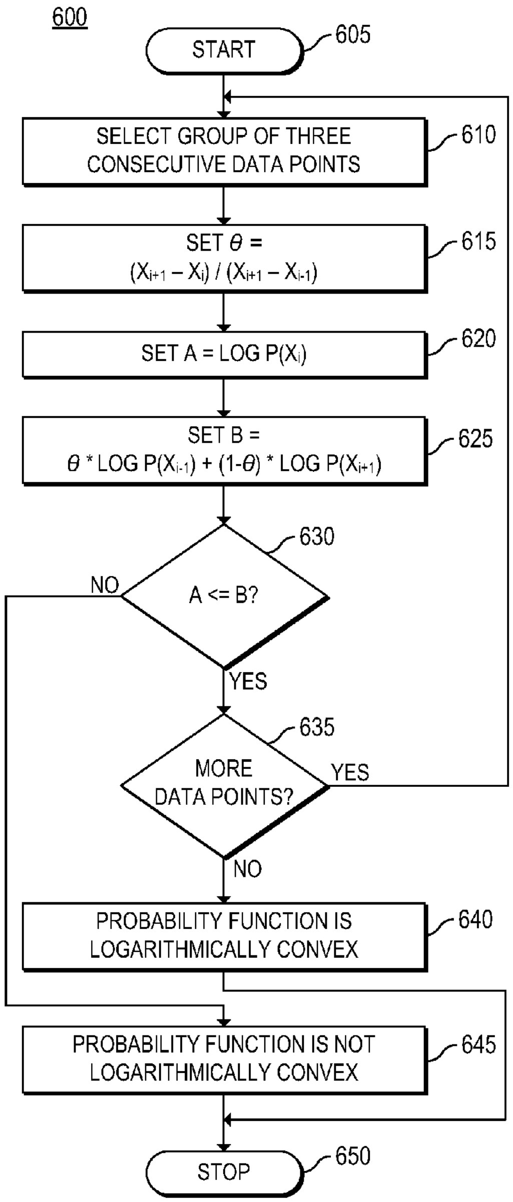
FIG. 6 is a flowchart of an example method for determining the log convexity of a set of data points corresponding to a probability function.

FIG. 6 is a flowchart of an example method 600 for determining the log convexity of a set of data points corresponding to a probability function. Although execution of method 600 is described below with reference to computing device 200, other suitable components for execution of method 600 will be apparent to those of skill in the art. Method 600 may be implemented in the form of executable instructions stored on a machine-readable storage medium, such as storage medium 220, and/or in the form of electronic circuitry.

Method 600 may start in block 605 and proceed to block 610, where computing device 200 may select a first group of three consecutive data points. Method 600 may then proceed to block 615, where computing device 200 may calculate a value, θ, where $\theta=(x_{i+1}-x_i)/(x_{i+1}-x_{i-1})$. Method 600 may then proceed to block 620, where computing device 200 may determine a value, A, as $\log(p(x_i))$, where p(x) is the probability function. Next, method 600 may proceed to block 625, where computing device 200 may determine a value, B, as $\theta \log(p(x_{i-1}))+(1-\theta)\log(p(x_{i+1}))$.

In block 630, computing device 200 may determine whether A≦B. If so, method 600 may proceed to block 635, where computing device 200 may determine whether there are remaining sets of data points to be tested. If there are remaining sets of data points, method 600 may return to block 610 for testing of the next set of points. Otherwise, if all sets of data points have been tested, method 600 may proceed to block 640, where computing device 200 may determine that, since A≦B for all sets of data points, the probability function is logarithmically convex. Method 600 may then proceed to block 650, where method 600 may stop.

On the other hand, if it is determined in block 630 that A>B, method 600 may proceed to block 645. In block 645, computing device 200 may determine that, because the inequality, A≦B, is not satisfied for at least one set of data points, the probability function is not logarithmically convex. Method 600 may then proceed to block 650, where method 600 may stop.

Figure 7A:
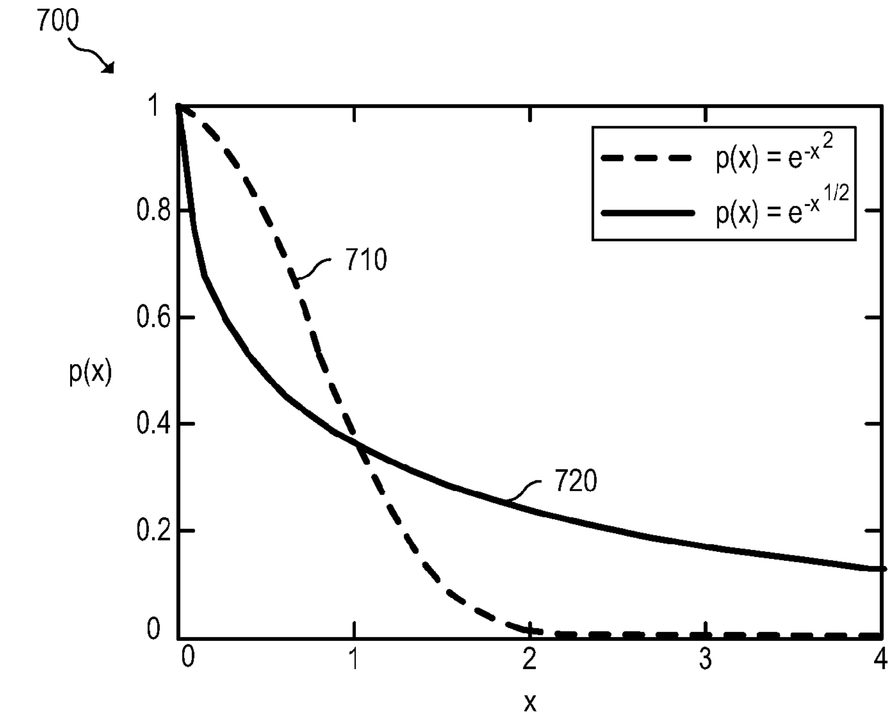
FIG. 7A is a graph illustrating an example log convex function and an example log concave function.

FIG. 7A is a graph 700 illustrating an example log convex function 720 and an example log concave function 710. As indicated by the legend in FIG. 7A, function 710 is defined as $p(x)=e^{-x^{0.5}}$, while function 720 is defined as $e^{-x^{2}}$. For probability function 710, since p(x) is log concave and therefore not log convex, a provider would maximize revenue by gradually increasing the level of inconvenience over time. More specifically, as described below in connection with FIG. 7B, the provider would maximize revenue by introducing a level of inconvenience, x, over a number of periods, z, that maximize the function Π(x, z). In contrast, for probability function 720, since p(x) is log convex, a provider would maximize revenue by increasing the level of inconvenience in a single increase. The optimal level of inconvenience would, in turn, be the value, x, that maximizes p(x)*r(x), where r(x) is a function representing the revenue earned by the provider per user for the level of inconvenience, x.

Figure 7B:
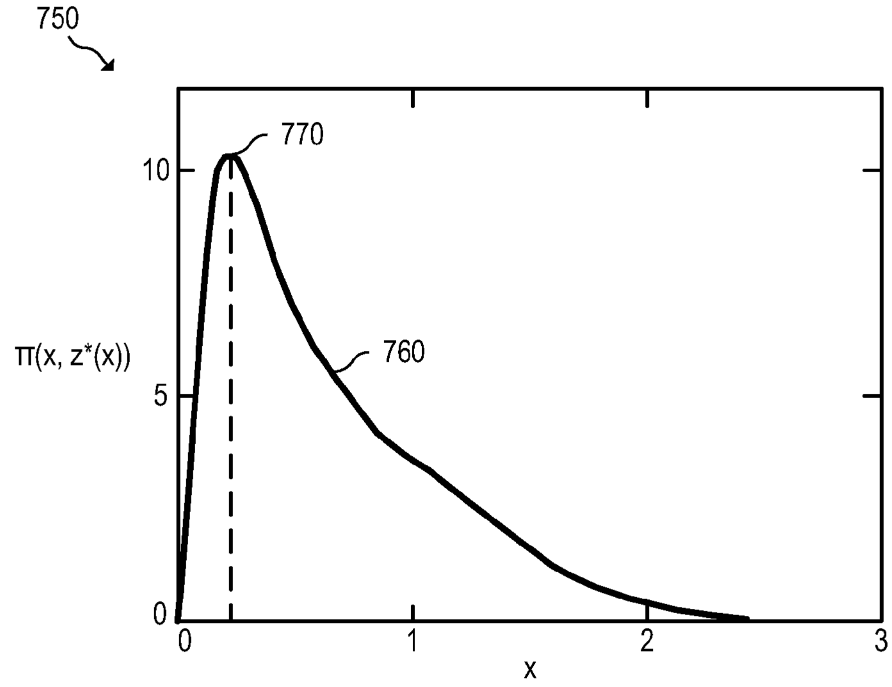
FIG. 7B is a graph illustrating an example function to be maximized to determine a number of periods and a level of inconvenience that generates provider revenue.

FIG. 7B is a graph 750 illustrating an example function 760 to be maximized to determine a number of periods, z, and a level of inconvenience, x, that maximize provider revenue. In the following example, suppose that δ=0.9, $p(x)=e^{-x^{2}}$, and r(x)=x. Because r(x), the revenue earned by the provider for a given level of inconvenience, is equal to x, this example may represent the situation where a provider wishes to introduce a subscription fee to the service in a manner that maximizes revenue.

Because p(x) is log concave function and is therefore not log convex, the level of inconvenience is optimally introduced over a number of periods. More specifically, the revenue earned by the provider is maximized by finding the solution that maximizes Problem 1, detailed above, for Π(x, z*(x)), where z*(x) is defined according to Equation 2, also detailed above.

Thus, as illustrated, the function Π(x, z*(x)) reaches a maximal value at x=0.195. Furthermore, z*(x)=26 when x=0.195. Thus, a provider would maximize its revenue by increasing the subscription fee by about $0.20 for a total of 26 times until reaching a final subscription fee of approximately $5.20.

According to the foregoing, example implementations examine the log convexity of a probability function representing a probability that a user of a service will continue to utilize a service when revenue-generating inconvenience is introduced. Example implementations then determine a number of periods over which the level of inconvenience should be introduced to the service based on whether the probability function is logarithmically convex or not logarithmically convex. In this manner, example implementations enable a service provider to determine an ideal level of inconvenience and a number of periods for introducing that inconvenience in a manner that generates revenue, while also maintaining the provider's user base.

We claim:

1. A computing device for determining a number of periods for introducing revenue-generating inconvenience to a service by a service provider, the computing device comprising:

a processor to:

identify a probability function describing a probability that a user will continue to utilize the service based on a level of inconvenience introduced to the service, determine whether the probability function is logarithmically convex, determine, when the probability function is logarithmically convex, that the level of inconvenience should be introduced in a single increase to generate revenue, and determine, when the probability function is not logarithmically convex, a number of periods for introducing the level of inconvenience that generates revenue over time.

2. The computing device of claim 1, wherein the processor identifies the probability function as a plurality of data points, each data point representing a probability that the user will continue utilizing the service when a corresponding level of inconvenience is introduced to the service.

3. The computing device of claim 1, wherein, when the probability function is logarithmically convex, the processor determines that the level of inconvenience should be introduced in a single increase to maximize total revenue earned by the service provider.

4. The computing device of claim 3, wherein, when the probability function is logarithmically convex, the processor further:

determines the level of inconvenience as a value that maximizes the probability function for a particular level of inconvenience multiplied by a revenue earned by the service provider for the particular level of inconvenience.

5. The computing device of claim 1, wherein, when the probability function is not logarithmically convex, the processor further:

determines the number of periods and the level of inconvenience by solving an optimization problem to maximize a total revenue earned over future periods, wherein:

the total revenue is a sum of a revenue calculated for each future period, and the revenue for each future period is a revenue value for a current level of inconvenience during the period multiplied by a fraction of users remaining during the period as predicted using the probability function.

6. The computing device of claim 5, wherein, in determining the fraction of users remaining during each period, the processor considers a cumulative effect of multiple introductions of inconvenience on the probability that the user will continue to utilize the service.

7. The computing device of claim 1, wherein the service is a website and the inconvenience is at least one of a number of advertisements and a subscription fee.

8. A machine-readable storage medium encoded with instructions executable by a processor of a computing device for determining a number of periods over which a level of revenue-generating inconvenience should be introduced to a service by a service provider, the machine-readable storage medium comprising:

instructions for identifying a probability function describing a probability that a user will continue to utilize the service as a function of a level of inconvenience introduced to the service;

instructions for determining whether the probability function is logarithmically convex; and instructions for determining the number of periods over which the level of inconvenience should be introduced to the service to generate revenue for the service provider based on whether the probability function is logarithmically convex or not logarithmically convex.

9. The machine-readable storage medium of claim 8, wherein the instructions for identifying the probability function identify a plurality of data points, each data point representing the probability that the user will continue to utilize the service when a corresponding level of inconvenience is introduced.

10. The machine-readable storage medium of claim 9, wherein the instructions for identifying the probability function determine the plurality of data points based on at least one of:

a testing procedure by which a control sample of users to which no inconvenience is introduced is compared to a test sample of users to which varying levels of inconvenience are introduced, and a survey procedure by which a test sample of users are queried to determine whether the users would continue to utilize the service when varying levels of inconvenience are introduced.

11. The machine-readable storage medium of claim 9, wherein the instructions for determining whether the probability function, p(x), is logarithmically convex comprise:

instructions for calculating a value, θ, for each set of consecutive data points, $x_{i-1}$, $x_i$, and $x_{i+1}$, wherein:

$$\theta = \frac{x_{i+1} - x_i}{x_{i+1} - x_{i-1}};$$

instructions for determining, for each set of consecutive data points, whether an inequality is satisfied, wherein the inequality is:

$$\log(p(x_i)) \leqq \theta \log(p(x_{i-1})) + (1-\theta)\log(p(x_{i+1}));$$ and instructions for determining that the probability function is logarithmically convex when the inequality is satisfied for all sets of consecutive data points and otherwise determining that the probability function is not logarithmically convex.

12. The machine-readable storage medium of claim 8, wherein, when the probability function is logarithmically convex, the instructions for determining the number of periods over which the level of inconvenience should be introduced determine the number of periods to be 1, such that the level of inconvenience is introduced in a single increase.

13. The machine-readable storage medium of claim 12, wherein the instructions for determining the number of periods further comprise:

instructions for calculating the level of inconvenience as a value that maximizes a revenue function, wherein the revenue function is defined as the probability function for a particular level of inconvenience multiplied by a revenue earned by the service provider for the particular level of inconvenience.

14. The machine-readable storage medium of claim 8, wherein, when the probability function is not logarithmically convex, the instructions for determining the number of periods over which the level of inconvenience should be introduced comprise:

instructions for solving an optimization problem to find the number of periods and the level of inconvenience that maximize a revenue function representing a total revenue earned over future periods, wherein the revenue for each future period is equal to a value representing a fraction of remaining users predicted using the probability function multiplied by a potential revenue for the future period.

15. The machine-readable storage medium of claim 14, wherein, in determining the value representing the fraction of remaining users, the instructions for solving the optimization problem consider a cumulative effect of multiple introductions of inconvenience on the probability that the user will continue to utilize the service.

16. A method for adding revenue-generating features to a website in a manner that generates revenue, the method comprising:

identifying, by a computing device, a probability function representing a probability that a user will continue using the website as a function of a number of increases in revenue-generating features in the website;

determining whether the probability function is logarithmically convex;

determining a number of periods over which the revenue-generating features should be added to the website based on whether the probability function is logarithmically convex or not logarithmically convex; and adding the revenue-generating features to the website over the determined number of periods.

17. The method of claim 16, wherein identifying the probability function comprises:

determining a plurality of data points, each data point representing the probability that the user will continue using the website when a corresponding level of revenue-generating features is added to the website.

18. The method of claim 16, wherein identifying the probability function comprises:

adding a number of revenue-generating features for a subset of users of the website; and determining the probability function based on a fraction of users in the subset of users that continue using the website after adding the number of revenue-generating features.

19. The method of claim 16, wherein, when the probability function is logarithmically convex, determining the number of periods comprises:

determining that the revenue-generating features should be added to the website in a single increase equal to a total number of revenue-generating features; and calculating the total number of revenue-generating features as a value that maximizes the probability function for a particular number of revenue-generating features multiplied by a revenue earned for the particular number of revenue-generating features.

20. The method of claim 16, wherein, when the probability function is not logarithmically convex, determining the number of periods comprises:

solving an optimization problem to determine the number of periods and a number of revenue-generating features to be added during each period that maximizes a revenue function representing a total revenue earned by the revenue-generating features over future periods.

* * * * *